(12) United States Patent
Belehradek et al.

(10) Patent No.: US 6,847,130 B1
(45) Date of Patent: Jan. 25, 2005

(54) UNINTERRUPTIBLE POWER SYSTEM

(75) Inventors: Anton Belehradek, Downers Grove, IL (US); Richard W. Potter, Winfield, IL (US); John R. Kochan, Jr., Naperville, IL (US)

(73) Assignee: Metropolitan Industries, Inc., Romeoville, IN (US)

( * ) Notice: Subject to any disclaimer, the term of this patent is extended or adjusted under 35 U.S.C. 154(b) by 0 days.

(21) Appl. No.: 10/247,265

(22) Filed: Sep. 19, 2002

(51) Int. Cl.[7] .................................................. H02J 7/00
(52) U.S. Cl. ....................................................... 307/66
(58) Field of Search .............................. 307/18–22, 29, 307/31, 38, 39, 46, 64–66, 85, 86

(56) References Cited

U.S. PATENT DOCUMENTS

| | | | | |
|---|---|---|---|---|
| 5,418,403 A | * | 5/1995 | Morell, III | ................... 307/72 |
| 5,508,905 A | | 4/1996 | Reichard | |
| 5,808,376 A | * | 9/1998 | Gordon et al. | ................. 307/66 |
| 5,886,422 A | * | 3/1999 | Mills | ............................ 307/29 |
| 6,317,346 B1 | * | 11/2001 | Early | ............................ 363/65 |
| 6,322,325 B1 | | 11/2001 | Belehradek | |

* cited by examiner

*Primary Examiner*—Matthew V. Nguyen
(74) *Attorney, Agent, or Firm*—Welsh & Katz, Ltd.

(57) ABSTRACT

An uninterruptible power supply system senses quality of available three phase input power and determines if load requirements can be met therefrom. If not, it drives an inverter to generate acceptable quality three phase AC to supply to the load. In this mode, the energy is obtained from a battery array. A solar panel can be used as a primary or a secondary source of input energy.

24 Claims, 18 Drawing Sheets

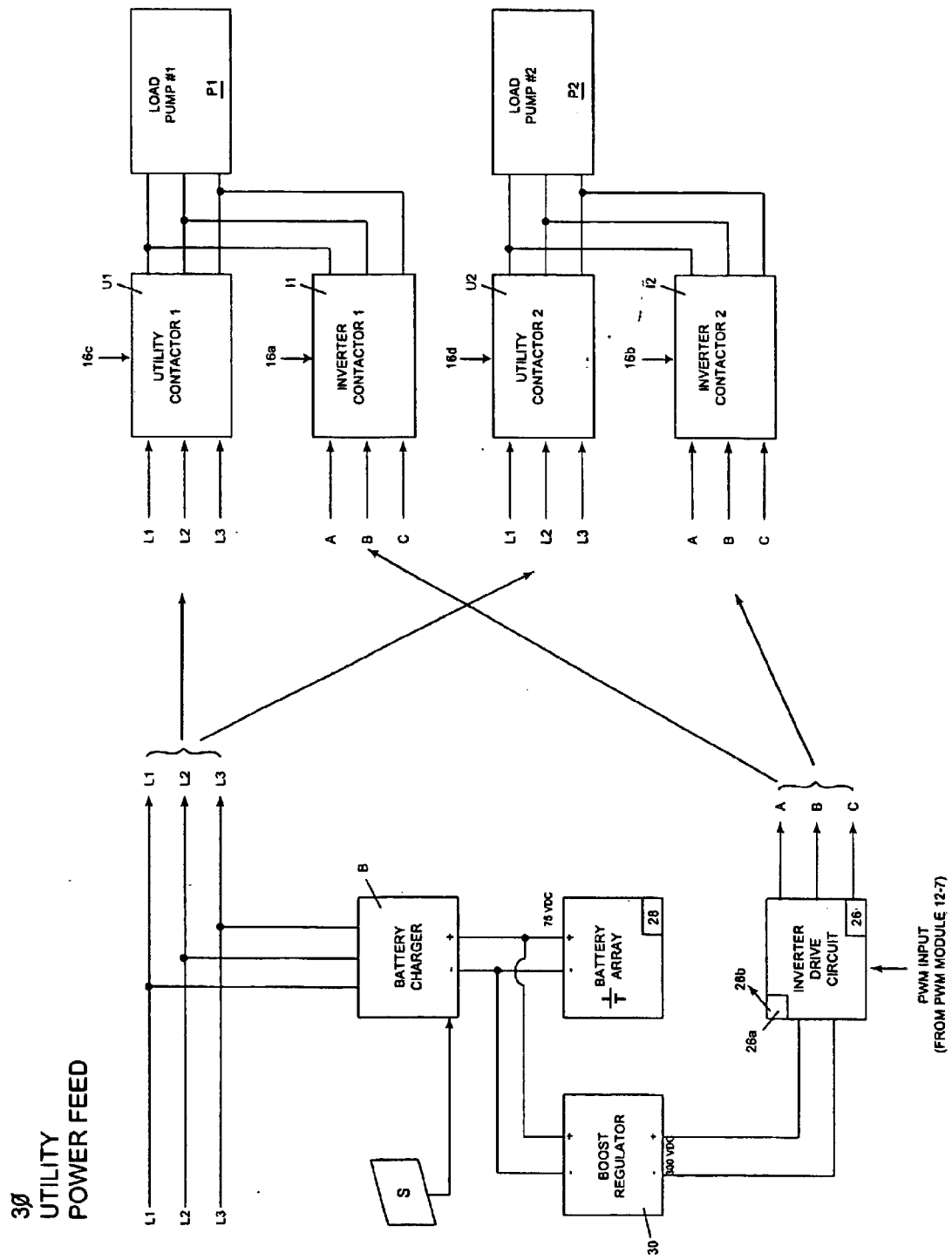
Figure #1A

Scenario: Incoming utility power is single phasing, that is one or more phases are inoperable, insufficient, or not present.

Scenario: Battery Charge Mode - utility power is present, either in full capacity or diminished.

Pump Control Algorithm

Utility Mode Pump Control

Backup Mode Pump Control**

Power Quality Algorithm

Figure 13A

```
                      System Status

Drive........Halted
Utility MSP...XXXXXXX         Frequency..
Pump 1 MSP..XXXXXXX           Pump #1....Halted
Pump 2 MSP..XXXXXXX           Pump #2....Halted
                              HV Boost...Standby High Float....XXXXXXX         Power Quality
Lag Float.....XXXXXXX         L1-L2.....Valid
Lead Float....XXXXXXX         L2-L3.....Valid
Off Float.....XXXXXXX         L3-L1.....Valid
Aux Float.....XXXXXXX
```

Figure 13B

```
                      System Status

Drive........Halted
Utility MSP...XXXXXXX         Frequency..
Pump 1 MSP..XXXXXXX           Pump #1....Halted
Pump 2 MSP..XXXXXXX           Pump #2....Halted
                              HV Boost...Standby High Float....XXXXXXX         Power Quality
Lag Float.....XXXXXXX         L1-L2.....Low
Lead Float....XXXXXXX         L2-L3.....Low
Off Float.....XXXXXXX         L3-L1.....Valid
Aux Float.....XXXXXXX
```

Figure 13C

```
                      System Status

Drive........Halted
Utility MSP...XXXXXXX         Frequency..
Pump 1 MSP..XXXXXXX           Pump #1....Halted
Pump 2 MSP..XXXXXXX           Pump #2....Halted
                              HV Boost...Standby High Float....XXXXXXX         Power Quality
Lag Float.....XXXXXXX         L1-L2.....Valid
Lead Float....XXXXXXX         L2-L3.....High
Off Float.....XXXXXXX         L3-L1.....High
Aux Float.....XXXXXXX
```

UNINTERRUPTIBLE POWER SYSTEM

FIELD OF THE INVENTION

The invention pertains to uninterruptible power supplies or systems usable to electrically energize loads such as pumps. More particularly, the invention pertains to such power systems which can operate off of and switch between different sources of electrical energy.

BACKGROUND OF THE INVENTION

Uninterruptible power supplies or systems have been used to provide reliable sources of electrical energy to loads, such as electric motors for pumps, in the presence of unreliable or inadequate utility supplied energy. Such supplies, for example, have included rechargeable back-up batteries and AC inverter drive circuits which are activated in the event that the utility supplied power ceases to be available. One such system is disclosed in U.S. Pat. No 5,508,905, entitled, "Low Distortion Variable Output Power", assigned to the assignee hereof and incorporated by reference herein.

While useful, known systems tend to have limited capabilities. For example, known systems are often fed from single phase AC and are intended to drive single phase loads, such as single phase motors. Not only is there limited input flexibility, known systems often are designed to drive a single electrical output. Driving multiple loads has often required multiple supplies. In addition, input electrical sensing capabilities have been limited to sensing the presence or absence of input AC and not the quality of the available energy.

There is a continuing need for uninterruptible power supply systems which can be driven from multi-phase utility power, for example three phase power, and which can automatically switch and drive multiple loads. It would be desirable to be able to evaluate the quality of incoming energy to determine if it is sufficient to energize the loads. It would also be desirable to be able to load or modify the parameters of such systems locally from another computer or remotely, via an electronic network such as the world wide web. Finally, it would be desirable to incorporate software and one or more programmed processors in such systems to minimize costs and maximize system flexibility.

BRIEF DESCRIPTION OF THE CLAIMS

FIG. 1A is a block diagram supplementing FIG. 1;

Figure 3A:
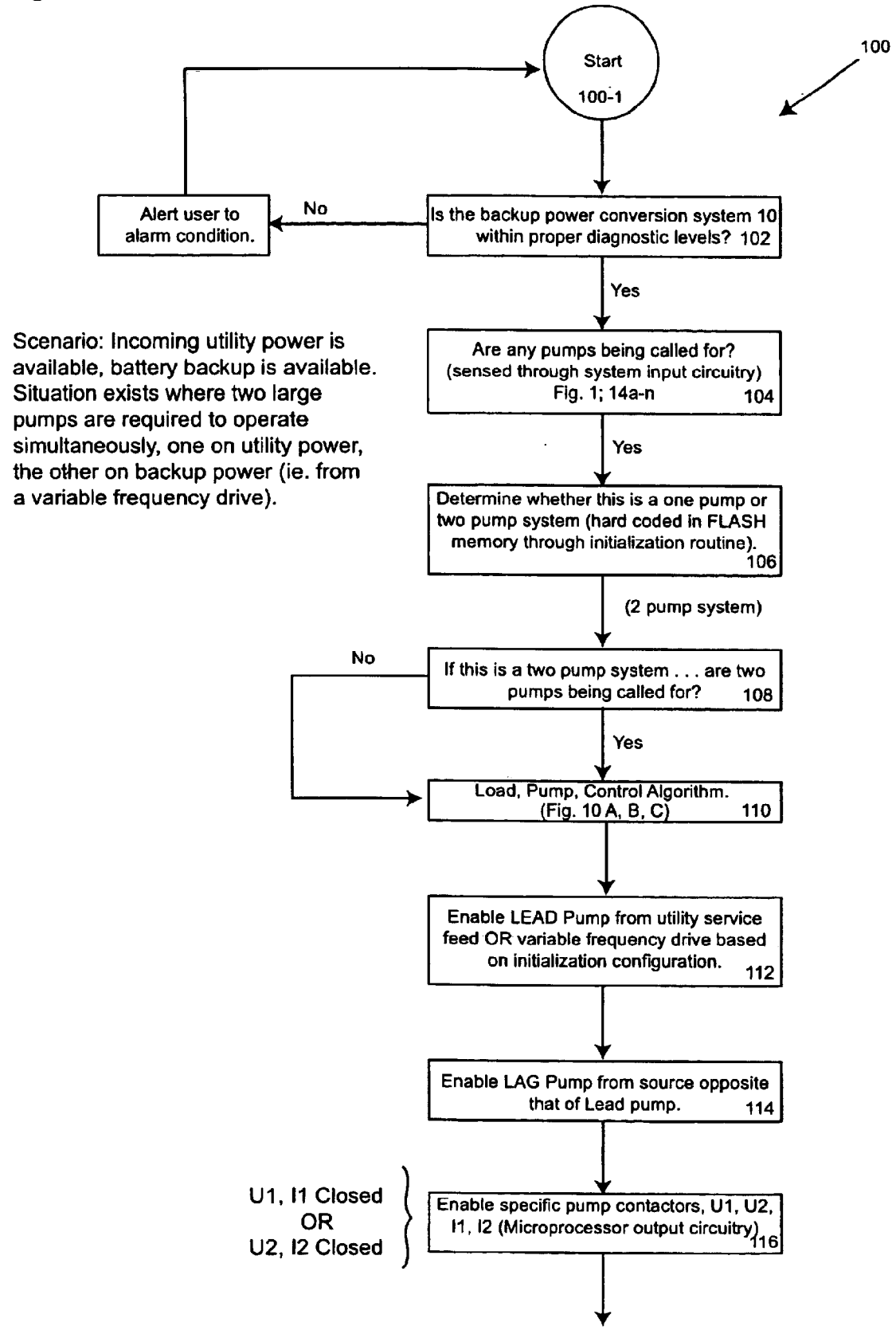
Figure 3B:
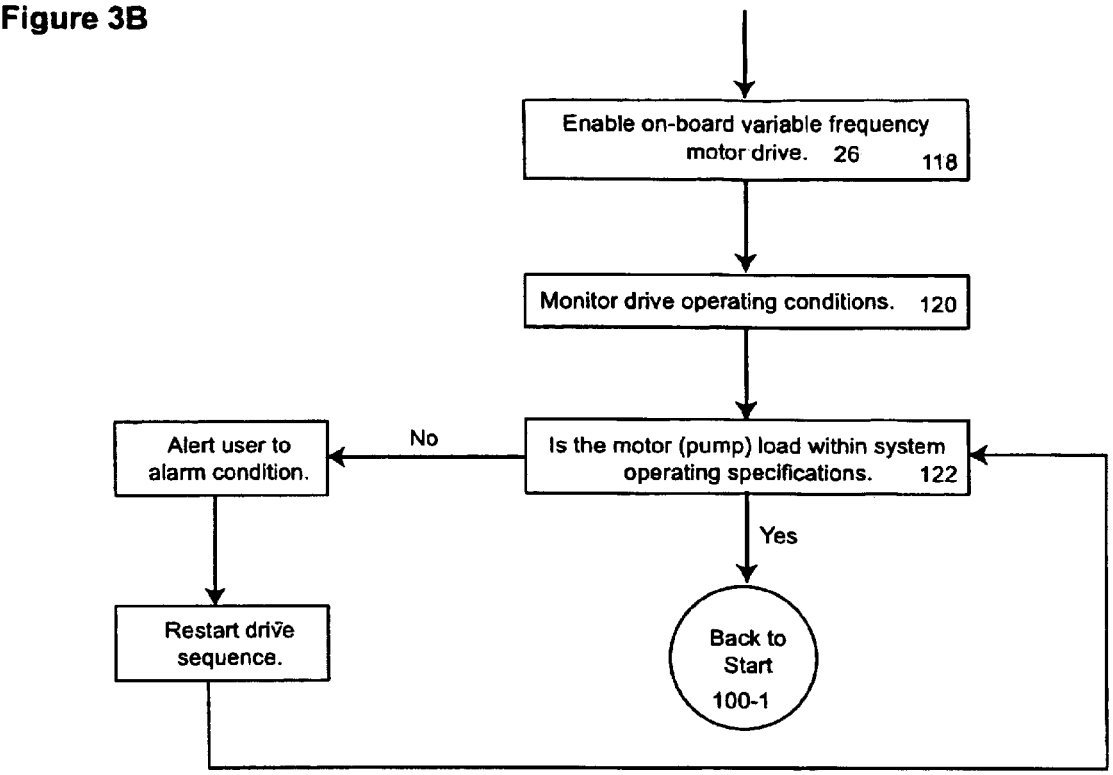
Figure 4A:
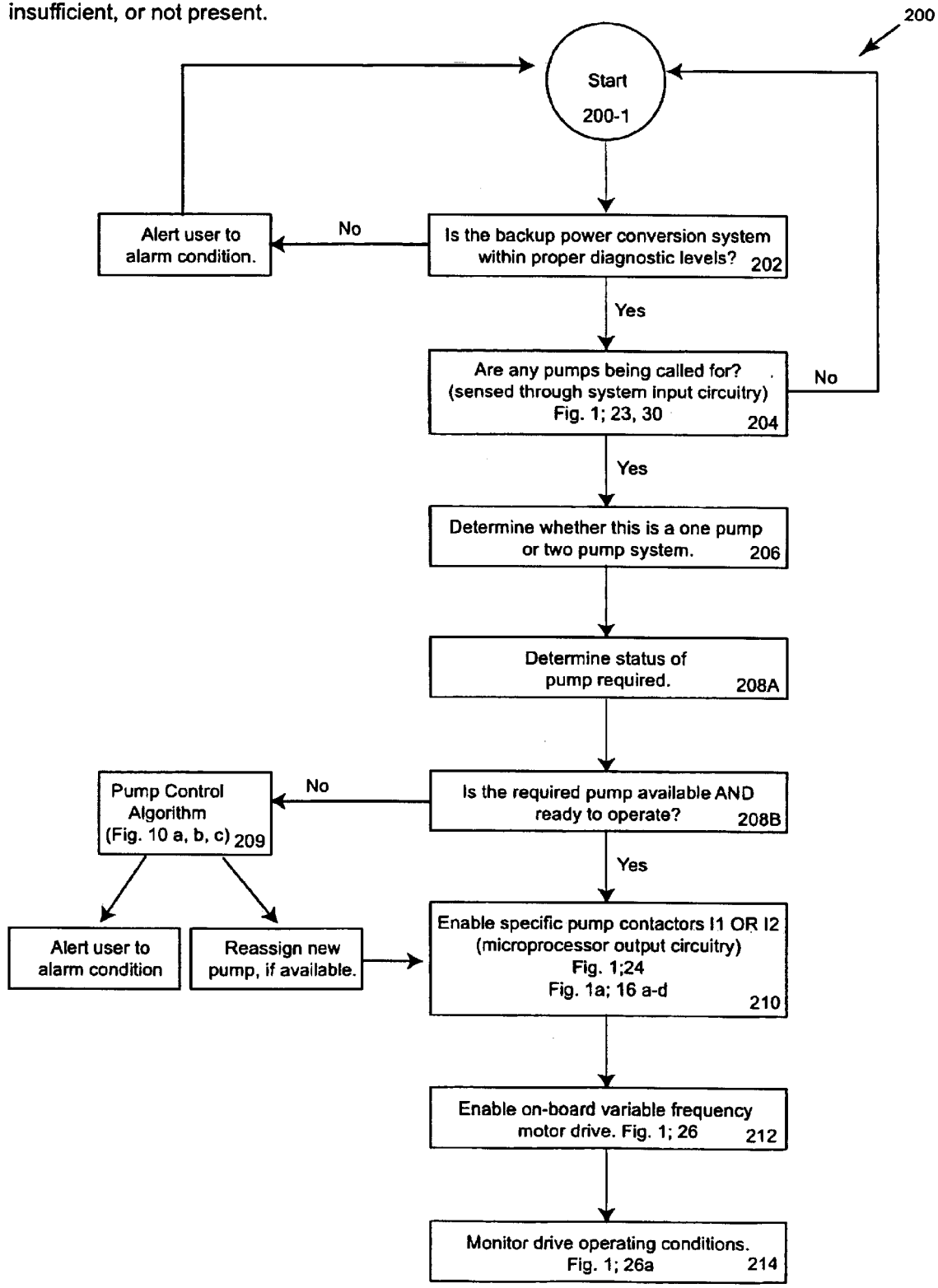
Figure 5:
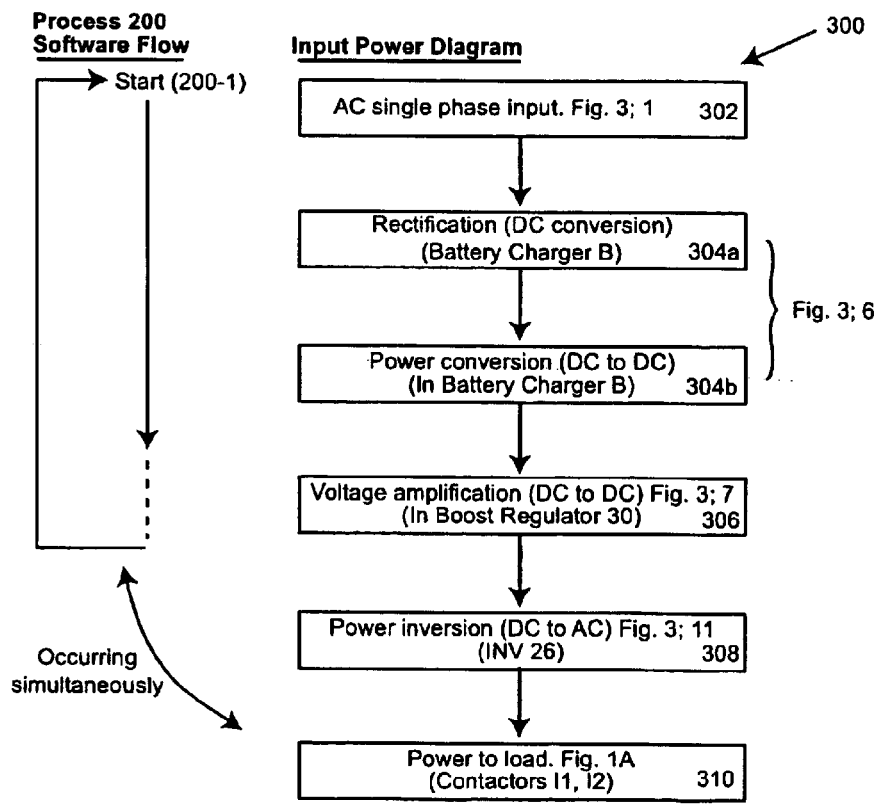
Figure 6:
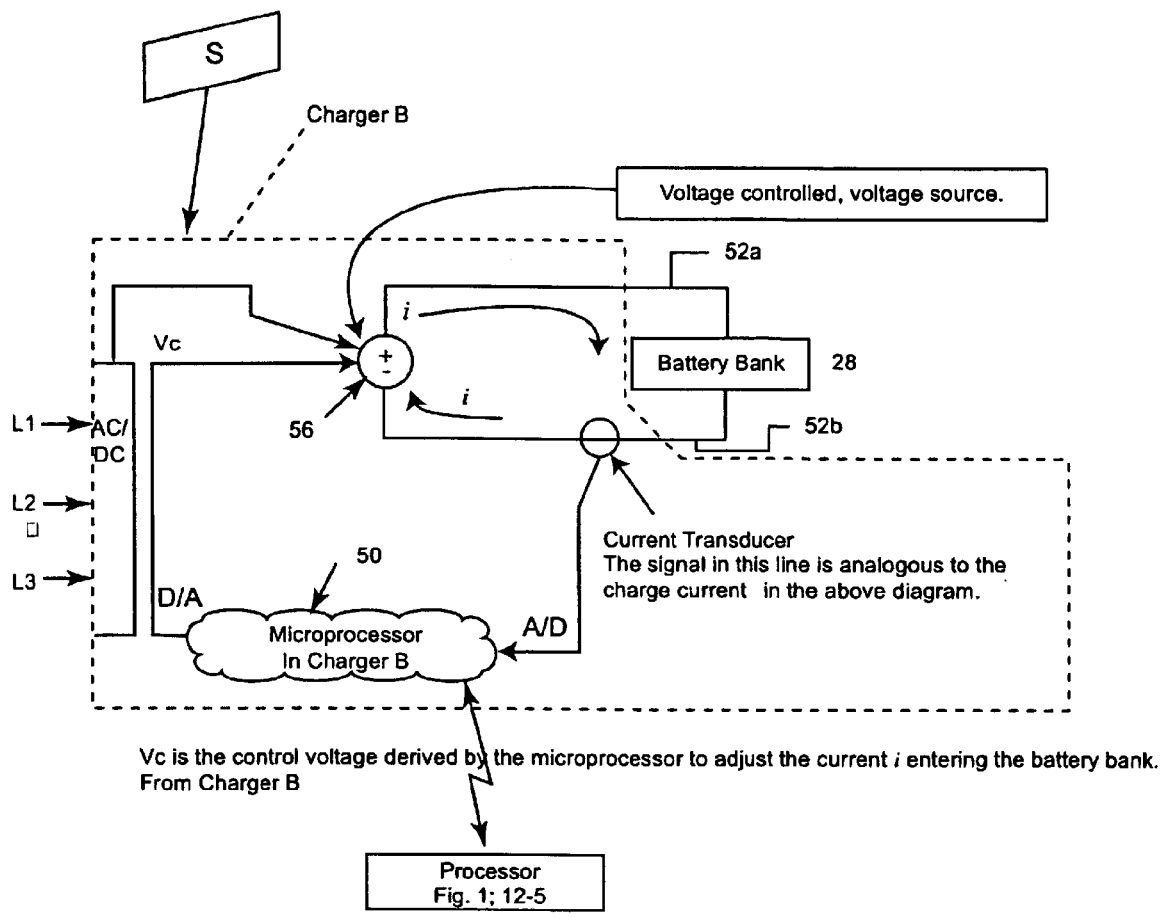
Figure 7A:
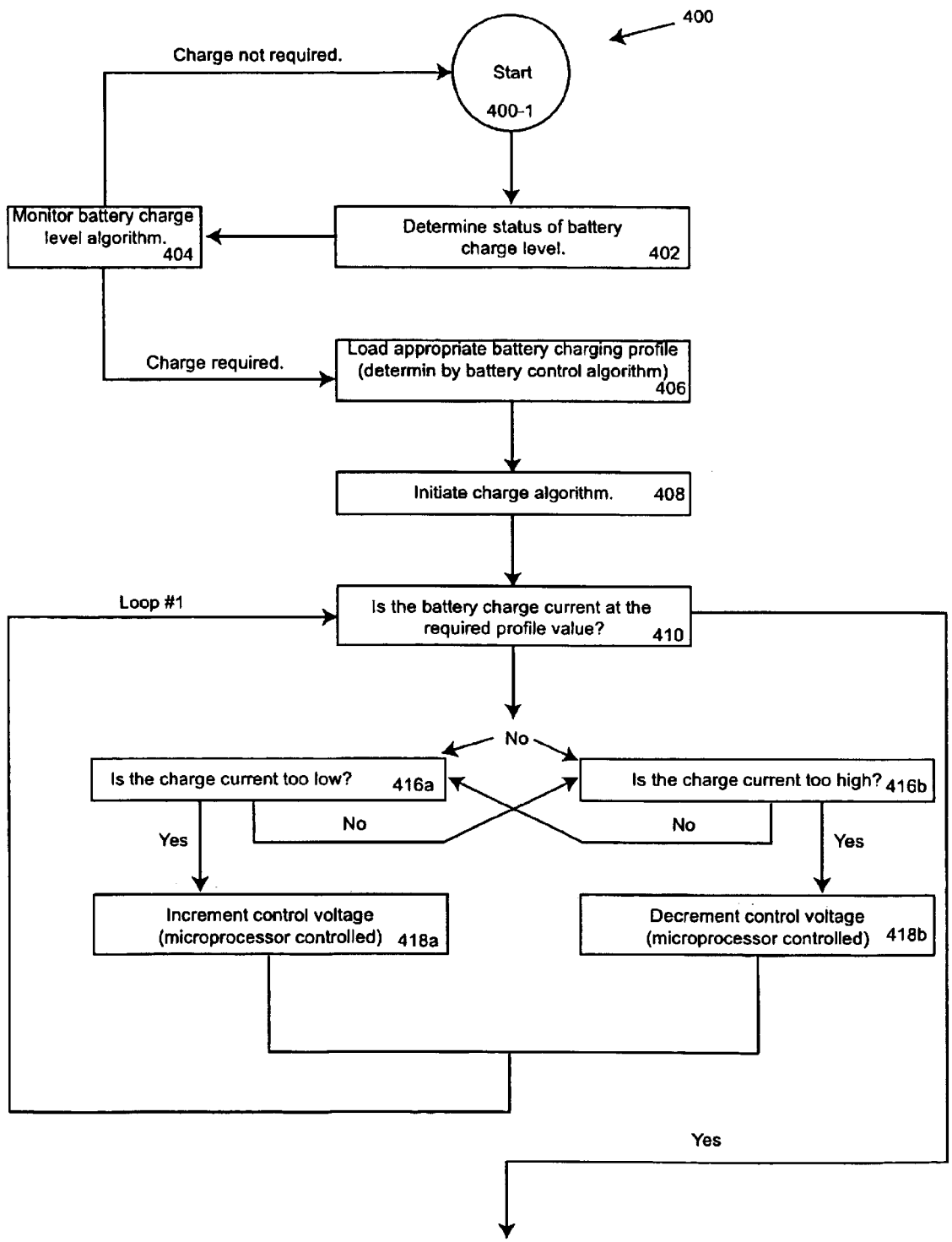
Figure 7B:
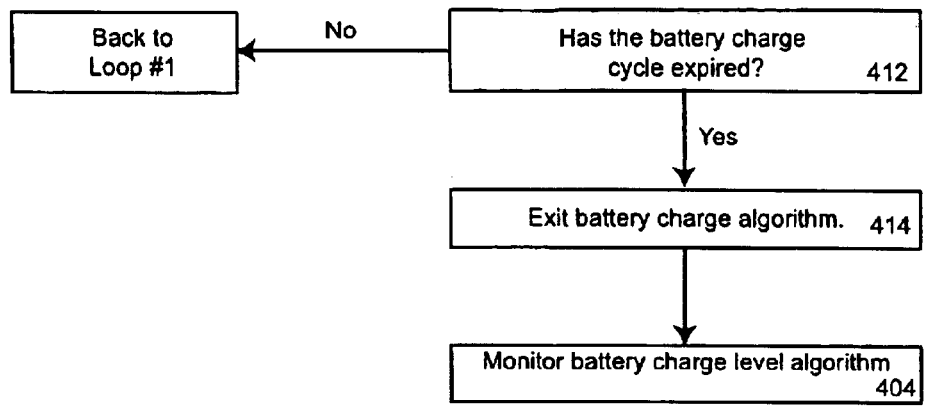
Figure 8A:
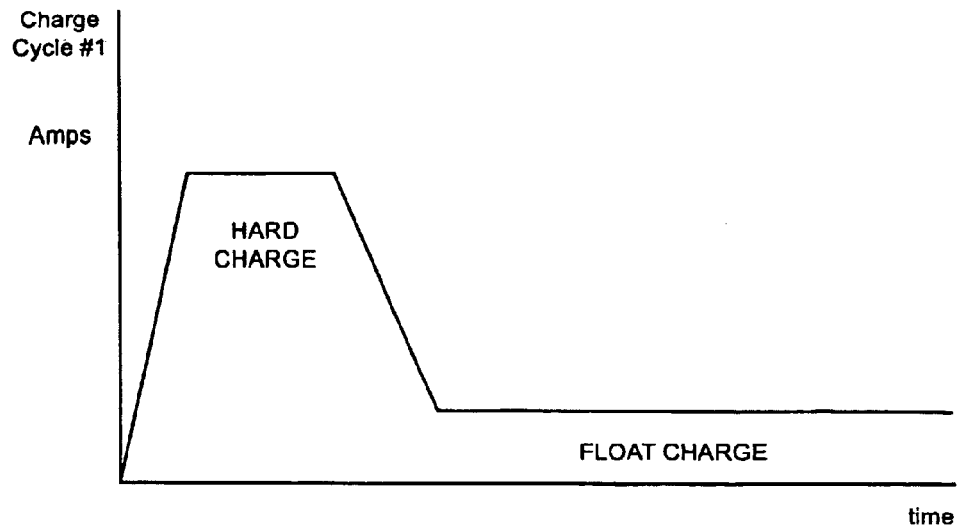
Figure 8B:
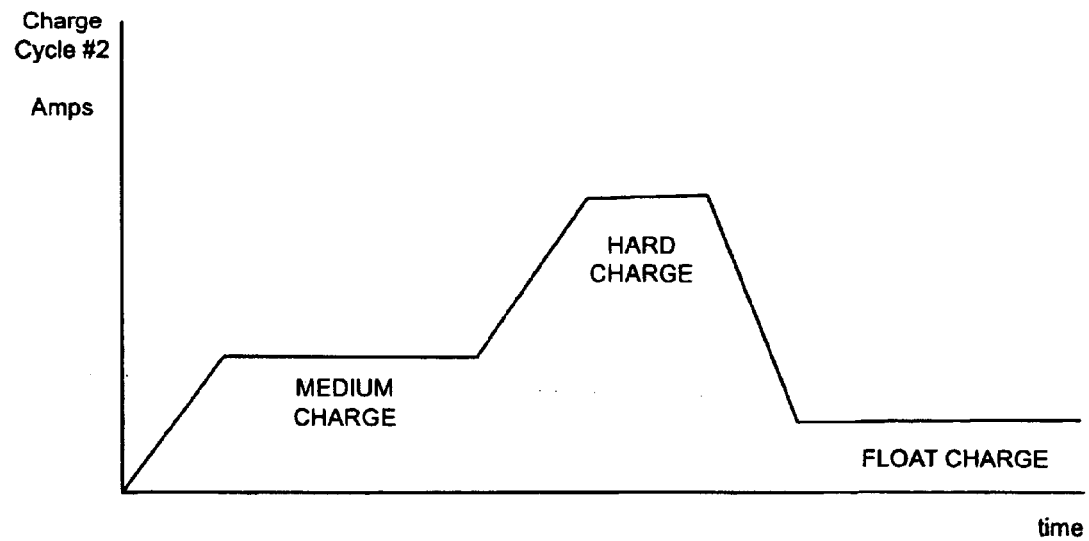
Figure 9:
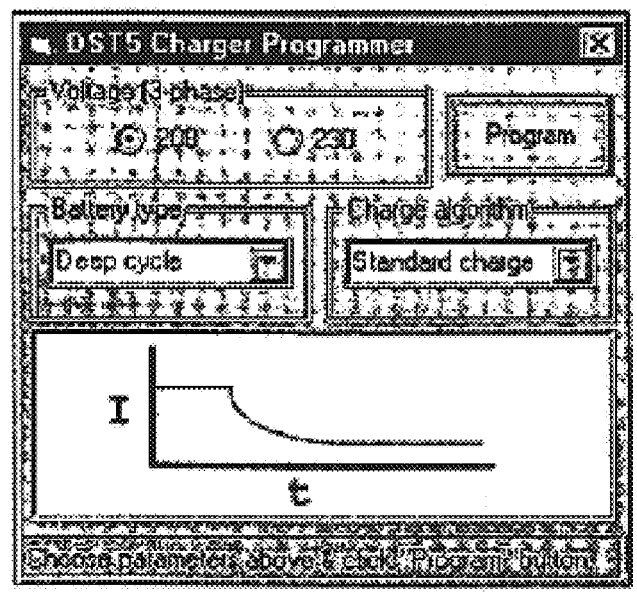
Figure 10A:
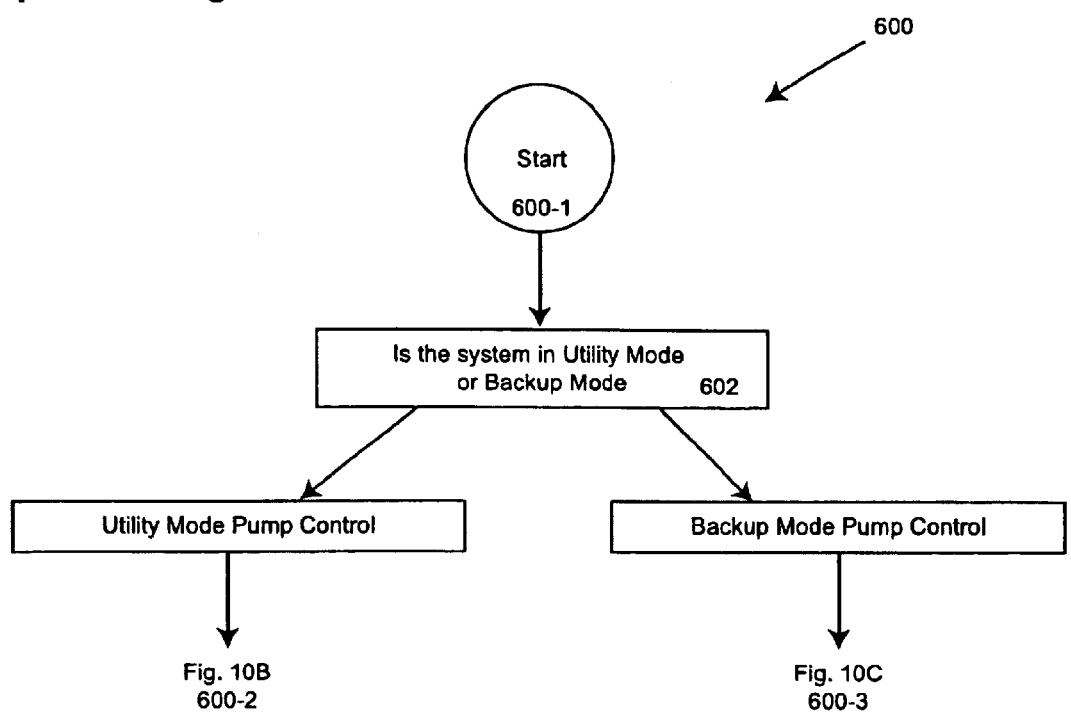
Figure 11:
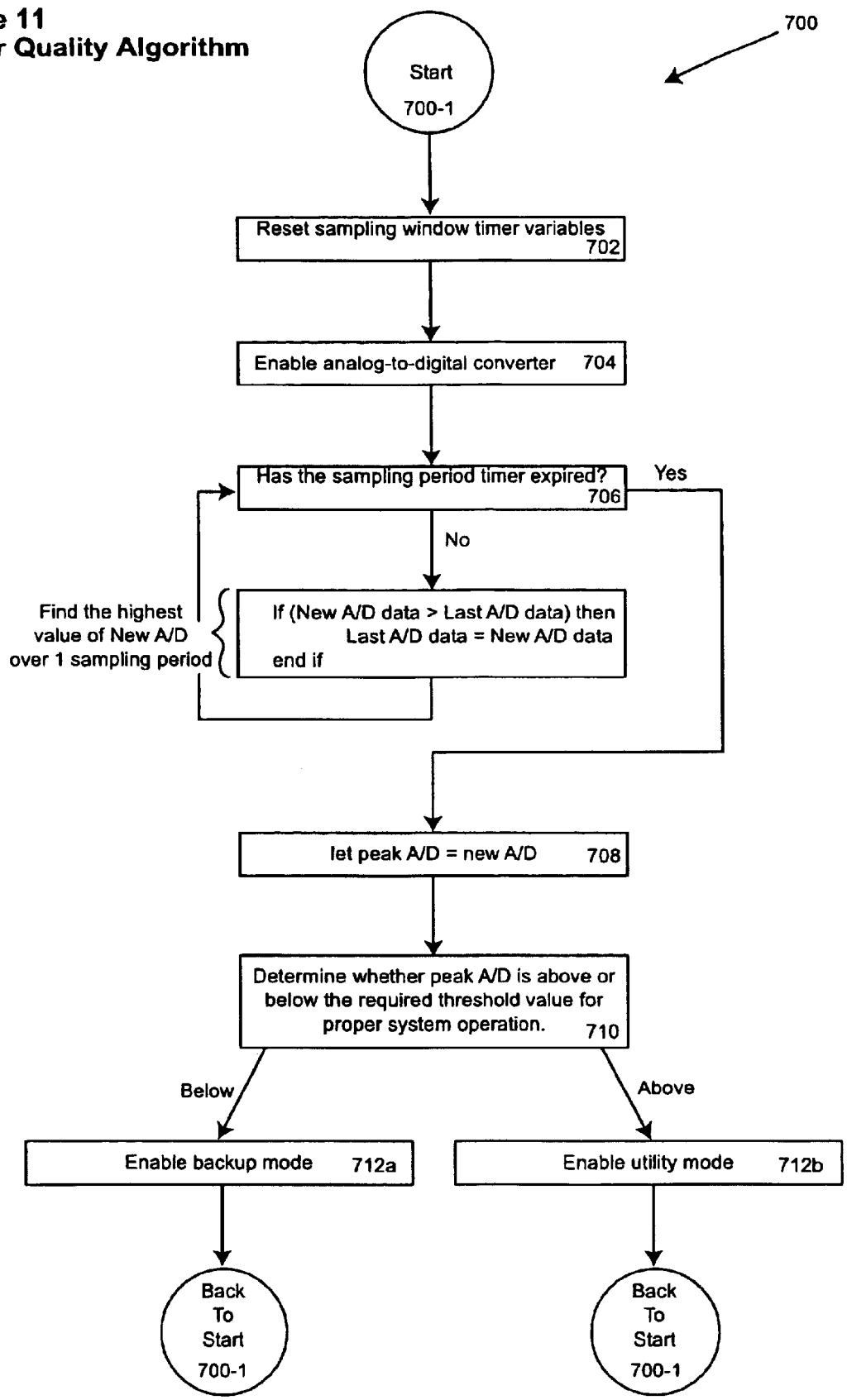
Figure 12:
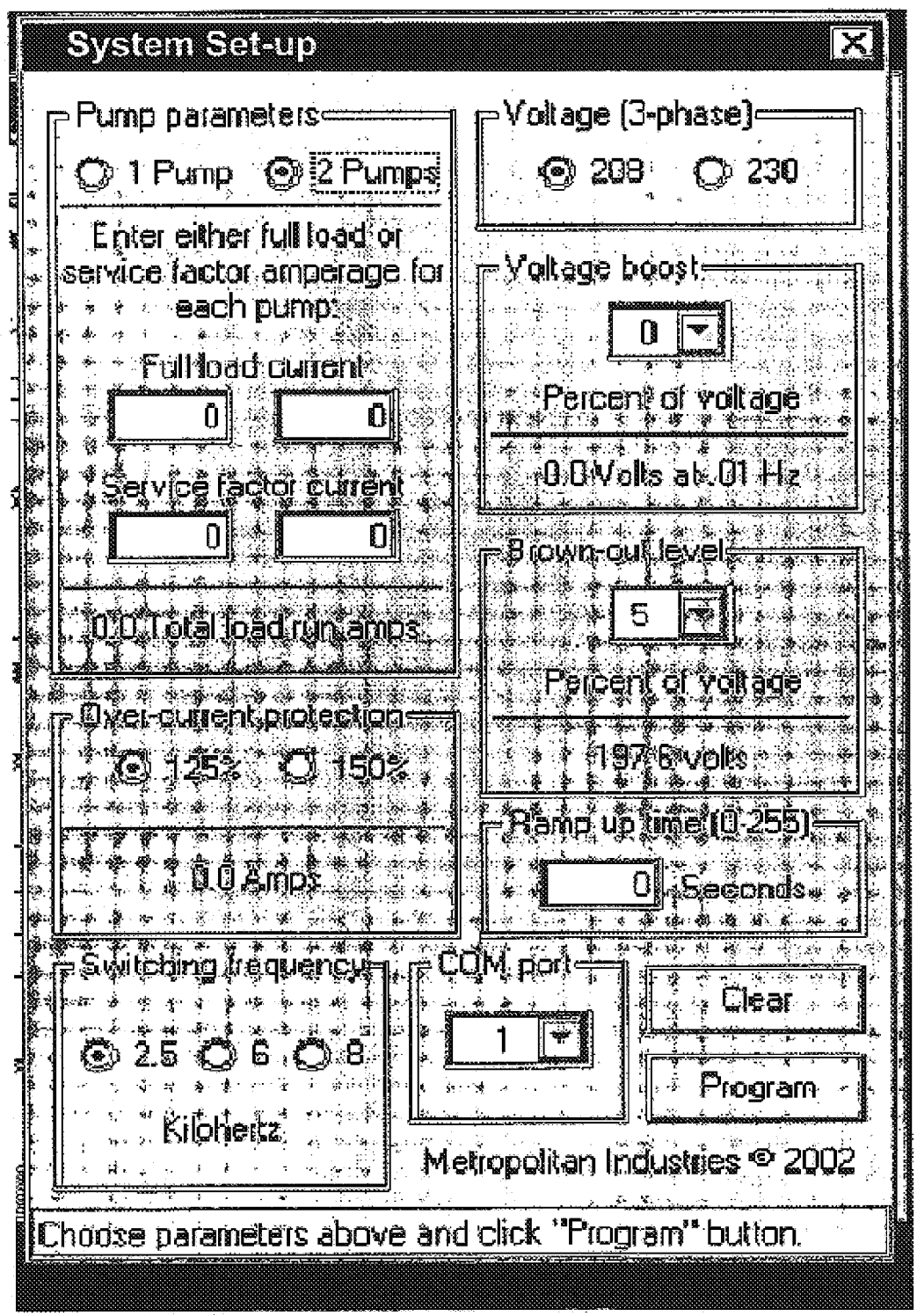

FIGS. 3A,B taken together are a flow diagram of processing in response to one possible energy condition;

FIGS. 4A,B taken together are a flow diagram of processing in response to another possible input power condition;

FIG. 5 illustrates one process of battery array recharging;

FIG. 6 is a block diagram illustrating aspects of array charging circuitry;

FIGS. 7A,B are a flow diagram illustrating a process of charging a battery array;

FIGS. 8A,B are exemplary graphs of battery charging currents;

FIG. 9 is a screen for specifying battery charging current as in FIGS. 8A,B;

FIGS. 10A,B,C are a flow diagram illustrating a load or loads, for example pump motor or motors, control process;

FIG. 11 is a flow diagram of exemplary analysis of input power quality;

FIG. 12 is a system set-up screen; and

FIGS. 13A,B,C illustrate displays of various system conditions.

BRIEF DESCRIPTION OF THE CLAIMS

While embodiments of this invention can take many different forms, specific embodiments thereof are shown in the drawings and will be described herein in detail with the understanding that the present disclosure is to be considered as an exemplification of the principles of the invention and is not intended to limit the invention to the specific embodiment illustrated.

A multi-mode uninterruptible power supply system can be energized off of standard three phase utility power, standard single phase utility power, degraded single phase or polyphase power or battery back-up power. The system incorporates a programmed processor which monitors a plurality of inputs to produce one AC-type output or first and second AC-type electrical outputs which could be used, for example, to drive one or first and second loads such-as sources of illumination, or electric units including electric motors usable to drive other devices such as refrigeration units, conveyors or pumps.

In one embodiment, utility supplied power can be used to drive one or both loads. Alternately, both utility supplied energy and AC derived from the back up batteries can be used to simultaneously drive two different AC loads. In the event of utility transient events, systems in accordance with the invention can automatically switch to battery back-up power to continue to provide electrical energy of appropriate characteristics to the load or loads.

In one embodiment, a voltage boost system can step up DC output from a battery bank or array, for example 65 volts DC to 80 volts DC, to 300 volts DC. This voltage can be converted to three phase AC using inverter drive circuitry. In response to a partial or complete utility power failure or deterioration, the system can switch to inverter generated power to energize the load or loads. The output frequency of the inverters can be increased from a low frequency near zero Hz to 60 Hz which eliminates large initial in-rush currents to the loads.

A solar panel or panels can be coupled to the system to provide a primary or an auxiliary source of energy to charge the battery array. Such installations could be energized entirely with stored solar energy. For example, remote or isolated locations at which pumps or emergency equipment need to be installed do not necessary have utility power available.

The power supply system can be installed and used to power the pump or pumps or other equipment from the battery bank. The equipment can be operated, as needed in the presence of sun light which can simultaneously be used to charge the battery bank. In the absence of sun light the equipment can operate normally until the energy stored in the battery bank has been depleted. Subsequently, for example the next day, with the rising of the sun the system could start the process of recharging the battery bank with sufficient stored energy, AC power from the supply can then be used to power the equipment.

In another aspect, the parameters for the power supply and, or, the load or loads can be entered from a PC or a lap-top either locally or remotely via an electronic network such as the internet. In addition, the operating characteristics of the supply can be altered locally or remotely using a PC or a lap-top.

In normal operation, utility supplied power drives loads. In back-up operation, the inverter and battery supplied energy power one or more loads. During these modes of operation, the battery array is continually being recharged from available utility supplied AC even if insufficient to power the load or loads.

Figure 1:
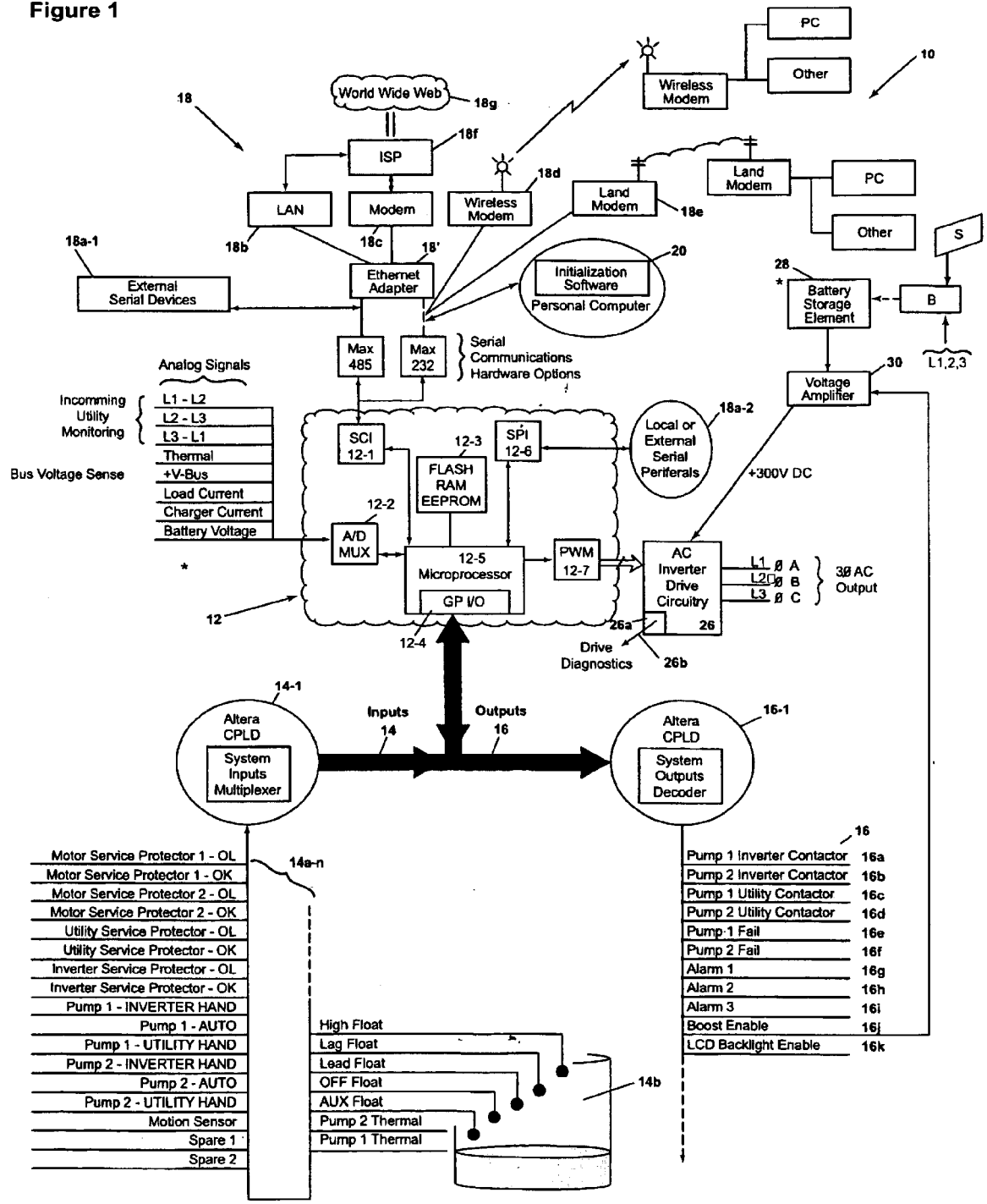
FIG. 1 is a block diagram of a system in accordance with the invention.

FIG. 1 is a block diagram of aspects of a system 10 in accordance with the invention. The exemplary block diagram of system 10 has been configured with pump motors as the two loads. Appropriate input signals are provided from floats in a tank whose level is to be controlled. It will be understood that the system 10 can be configured to run loads other than pump motors without departing from the spirit and scope of the invention.

System 10 includes a programmed processing system generally indicated at 12. Processing system 12 includes a serial communications interface 12-1, an A/D converter/multiplexer 12-2, EEPROM 12-3, for storage of programs and constants, a general purpose I/O port 12-4 of a processing unit 12-5. Processing system 12 also includes a serial peripheral interface 12-6 and a pulse width modulation output module 12-7.

Inputs 14 from a plurality of switches, contactors and sensors are coupled to I/O interface 12-4. Outputs 16 are provided by I/O 12-4. The inputs 14a, b, c . . . n from various loads and sensors are multiplexed by multiplexer 14-1 prior to being coupled to the I/O interface 12-4. Inputs can include signals from a plurality of floats in a tank of liquid 14b.

Outputs 16 are coupled via decoder 16-1 to a plurality of different output lines 16a,b,c . . . m. The various outputs 16 are in turn coupled to power control contactors, see FIG. 1A, as well as to various output indicators.

Executable instructions, parameters or other information can be supplied to or received from system 10 via generalized input/output system 18. System 18 can include external serial devices 18a-1, local area network 18b, modem 18c, wireless modem 18d, a landline modem 18e, internet service provider 18f and ultimately the world wide web 18g.

A local laptop or PC 20 can be used to interrogate the processing system 12 as well as to provide parameters or commands thereto for set-up or subsequent reconfiguration purposes.

An AC inverter 26 can be driven from the PWM module 12-7 to produce three phase AC output on lines A, B, C. Diagnostic circuitry 26a provides output signals on lines 26b as to the operational status and condition of inverter 26.

Battery storage array 28 is coupled via a boost regulator 30 to the input port of the inverter 26. The storage array 28 is kept charged by charger circuitry B. Circuitry B receives either utility supplied energy, lines L1, L2, and L3 or energy from a solar array S. The array S can provide primary, and, or supplemental energy.

FIG. 1A illustrates additional components of the system 10. As illustrated therein, power contactors U1, U2, I1, and I2 receive either three phase utility supplied power, lines L1, L2, L3 or three phase output from inverter 26, lines A, B, C. Control signals 16a, b, c, d from processing system 12 open or close the respective contactors to energize Load 1 or Load 2 or both.

It will be understood that system 10 can be used to drive a variety of electrically actuated loads without limitation. For example, Loads 1,2 can correspond to electrically driven pumps P1, P2 used to control fluid as in a tank 14b. Alternately, the loads 1,2 can be electric motors used to run conveyors, for example. Other types of electrical equipment such as refrigeration equipment, heating and air conditioning equipment, traffic signals or other types of signals, sources of illumination or the like all without limitation can be powered by systems such as system 10.

System 10, as discussed in more detail subsequently can assess the nature and quality of available three phase, utility supplied AC and determine whether one or both of the loads, for example pumps P1, P2 should be driven with the utility supplied three phase, or whether one or both should be driven via inverter circuitry 26. In addition, the battery charging circuitry B can monitor the utility supplied AC as well as the state of the array 28 to charge same as needed.

Figure 2:
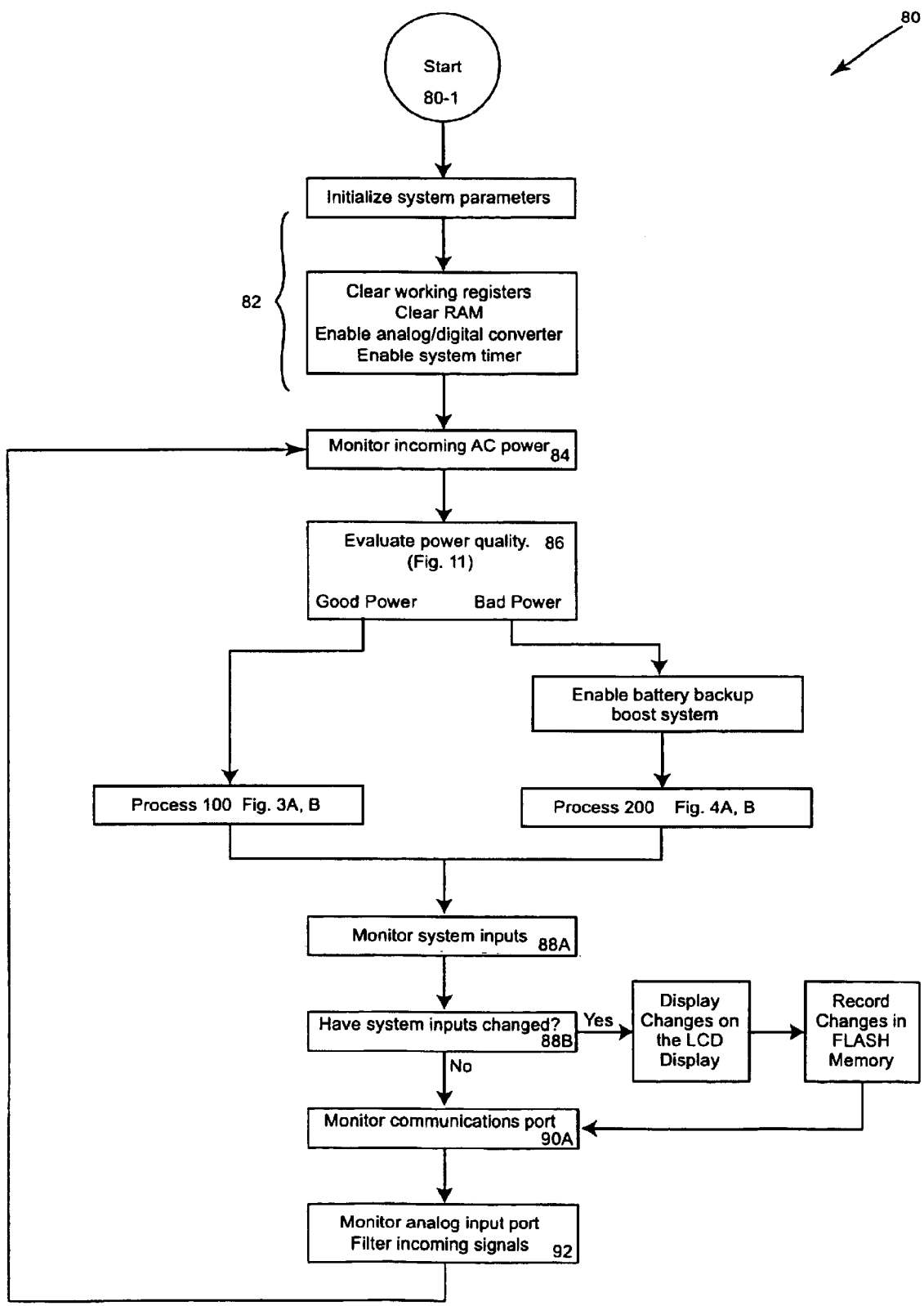
FIG. 2 is an over all system process diagram.

FIG. 2 illustrates a process 80 wherein system 10 can control two loads, such as two large pumps using utility supplied power. In a step 82 various system initialization events take place. Incoming utility supplied three phase AC power is monitored in step 84.

In step 86 the quality of the received three phase power is evaluated see FIG. 11. If the received power is suitable then process 100, FIGS. 3A, B, can be executed. If not, process 200, FIGS. 4A, B, can be executed. In addition, the system inputs are evaluated in steps 88A, B. Changes in inputs are displayed on the system display, for example an LCD, and also stored. The communications port is monitored for new data in step 90A. Additionally, analog input signals at port 12-2 can be monitored and filtered, step 92.

Processes 100, 200 are exemplary only. Variations therefrom come within the spirit and scope of the invention.

FIGS. 3A,B illustrate a process 100 wherein system 10 can control two loads, such as two large pumps which arc required to operate simultaneously. In this loop under normal operating conditions, the loads are actuated using utility supplied AC coupled through the system 10. In the event that utility supplied AC for some reason is not capable of starting two large loads simultaneously, one load can be driven by utility power. The other can be driven by backup power from the inverter 26.

In an exemplary embodiment, in a step 102 the operating state of system 10 is checked. Were the loads correspond to pump motors, in a step 104 float input signals, associated with tank 14b, received at multiplexer 14-1 are analyzed in processing system 12 to ascertain if any pumps are to be activated. Processing of such float input signals can be in accordance with Belehradek U.S. Pat. No. 6,322,325 assigned to the assignee hereof and incorporated herein by reference.

In a step 106 a determination is made as to whether there are one or two pumps to be driven. The number of pumps and/or their parameters can be entered via laptop 20 either during system set-up or subsequently.

In a step 108 for a two pump system, a determination is made as to whether one or two pumps are to be activated via a pump control algorithm, step 210. In steps 112, 114 the appropriate LEAD pump and LAG pump (as set up during initialization) are enabled. In a step 116, the specific load contactors, U1, U2, I1, or I2 are energized to drive the appropriate pump from the appropriate source.

In a step 118 the inverter 26 can be energized and its AC output frequency ramped up from essentially zero hertz to 60 hertz in a preset fashion to minimize starting currents. In step 120 drive operating conditions are monitored. In step 122 the operating characteristics of the load are monitored to determine that they are within normal limits.

FIGS. 4A,B illustrate a process 200 implemented when incoming utility power is deficient due to a variety of reasons including, single phasing, insufficient amplitude in utility supplied AC, a complete loss of utility supplied AC or unacceptable transients in the utility supplied AC. In the case of single phasing, at least one phase is inoperable, insufficient or not present. Where there is a deficiency in utility supplied AC, inverter generated back-up AC is required to drive the load or loads.

In step 202 the condition of system 10 is evaluated. If operating properly, in step 204 pump demand is sensed. In step 206 a determination is made as to the number of available pumps. In steps 208AB the condition and availability of the required pump is evaluated. If the pump is not available, step, 209, pump functions can be reallocated as, for example, disclosed in the '325 patent see also FIGS. 10A,B,C. If available, in step 210 the appropriate contactors I1, I2 are energized. In step 212 the inverter 26 is activated to drive the pump or pumps.

Figure 4B:
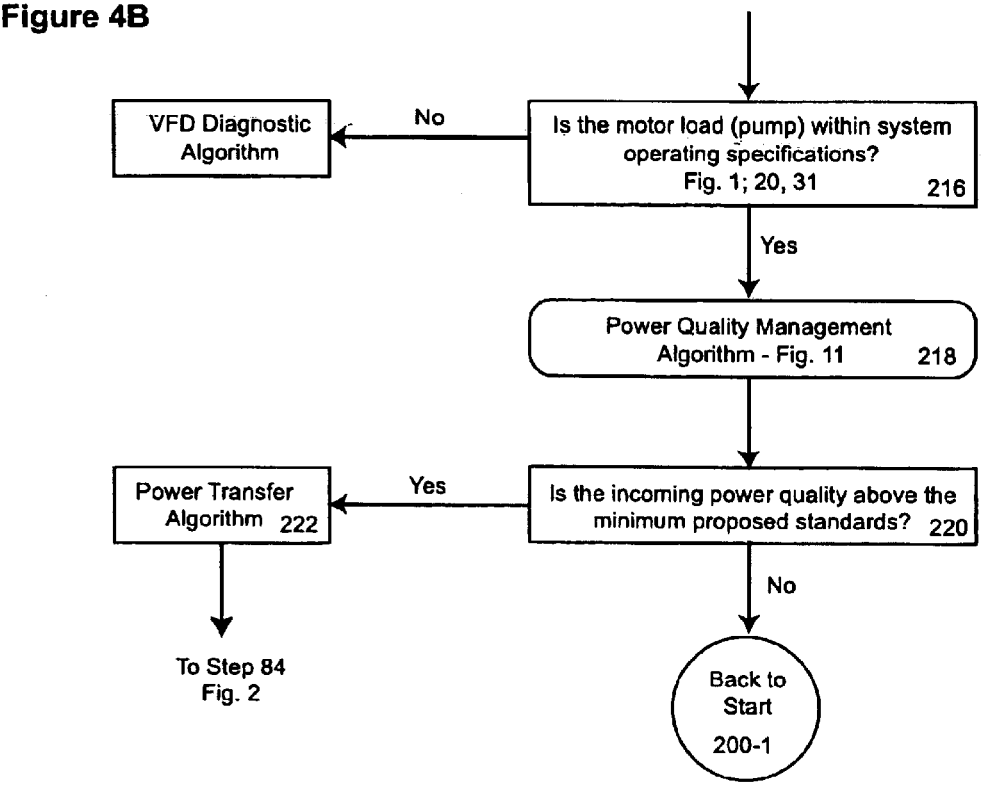

In step 214 the operation of the inverter 26 is monitored. In step 216 FIG. 4B, the operating characteristics of the pump or pumps P1, P2 is, are monitored. If suitable, in step 218 the power quality is evaluated see FIG. 11. In step 220 if the power quality is inadequate, the process 200 is continued. Otherwise in step 222 a power transfer process is implemented. The appropriate contactor U1, Us is closed, and system 10 returns to the process 80 or 100.

FIG. 5 illustrates a process 300 of operating charger B illustrated in more detail in FIG. 6. It will be understood that with the use of interrupt processing, process 300 can be executed essentially simultaneously with the steps of processes 200 without limitation.

In steps 304a, b in the presence of single phase AC, rectification, step 302, rectified AC is used to charge array 28. In step 306 boost regulator 27 is activated. In step 308, inverter 26 is driven to convert the boosted DC to three phase AC on lines A, B, and C. Finally, in step 310 the power is delivered to the selected load, such as pump P1, or P2 in accordance, for exmple, with FIGS. 4A,B. The process 300 is repeated as needed.

The charger B, illustrated in FIG. 6, includes a programmed processor 50 which implements battery charging in accordance with one or more pre-stored battery charging current profiles, see for example, FIGS. 8A,B. Charger B is coupled by lines 52a,b to the array 28. A current sensor 54 couples a signal indicative of charging current to the processor 50. Processor 50, in accordance with a pre-stored charging process, FIGS. 7A,B, adjusts a voltage controlled voltage or current source 56 to charge the array 28 in accordance with the pre-stored charging current profile.

Battery charging process 400, FIGS. 7A,B can be used to maintain energy stored in the array 28. The battery charge level is determined, step 402, by monitoring the condition of the array, step 404. If charging in required, a pre-stored charging current profile is retrieved from storage, step 406 see FIGS. 8A,B.

In step 408 charging is initiated. In step 410 the charging current is compared to the retrieved profile to determine if charging current needs to be adjusted. If no adjustment is needed, in step 412 a determination is made as to whether the battery charge cycle was completed. If not, the process returns to step 410. Otherwise the process returns to step 404.

In steps 416a,b the charge current is determined to be too low or too high. If low, the processor 50 increases same, step 418a. If charging current is too high it is decreased in step 418b.

The charging current profile can be entered at set-up depending on the characteristics of the array using a lap-top computer 20 and a current profile specification screen, illustrated in FIG. 9. As needed, the charging current profile, as in FIGS. 8A,B can be revised.

FIGS. 10A,B,C illustrate a process 600 carried out in step 209. It will be understood that while the steps of process 600 relate to motors to drive pumps, other types of loads can be driven by system 10 without limitation.

Figure 10B:
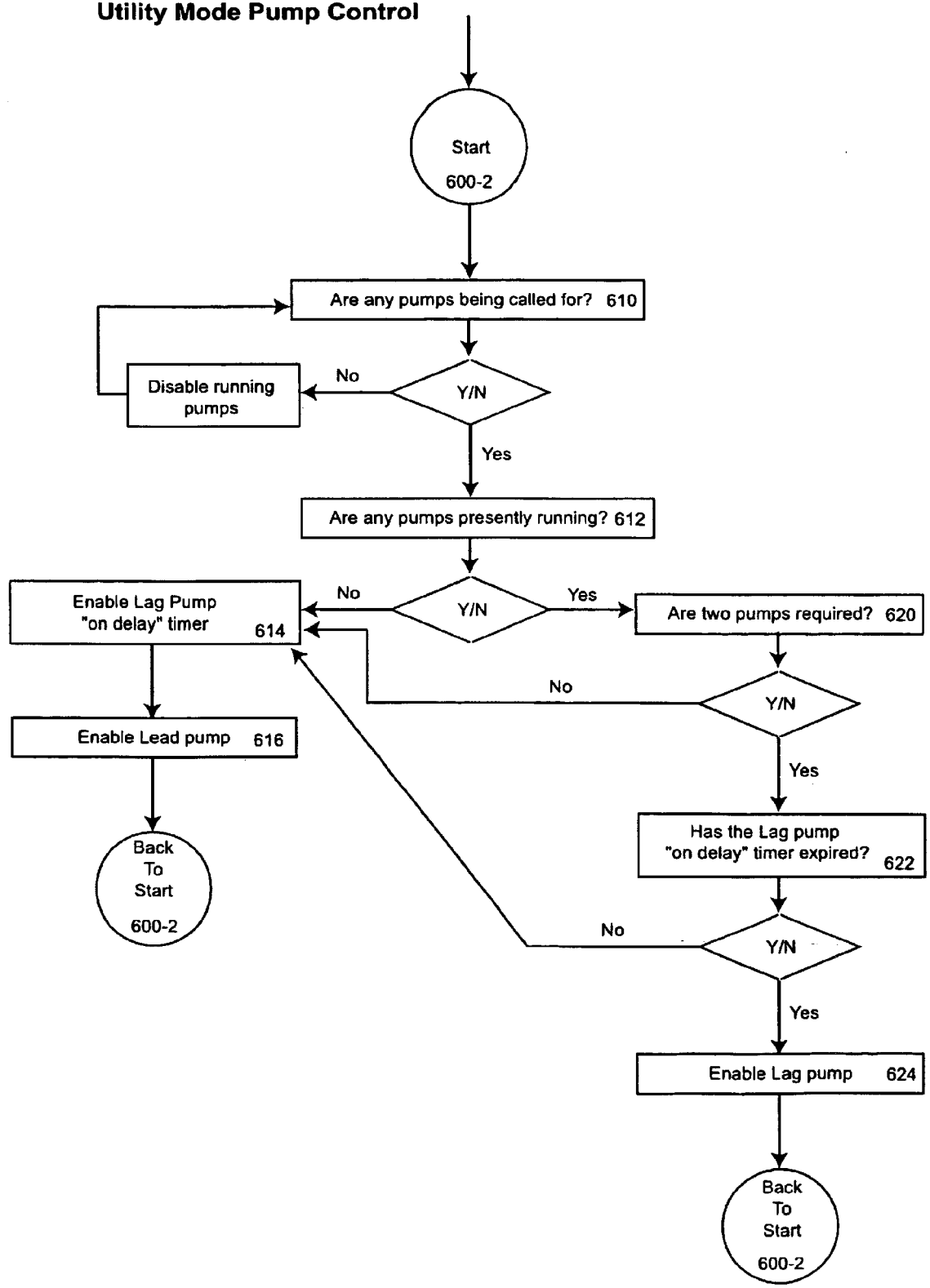
Figure 10C:
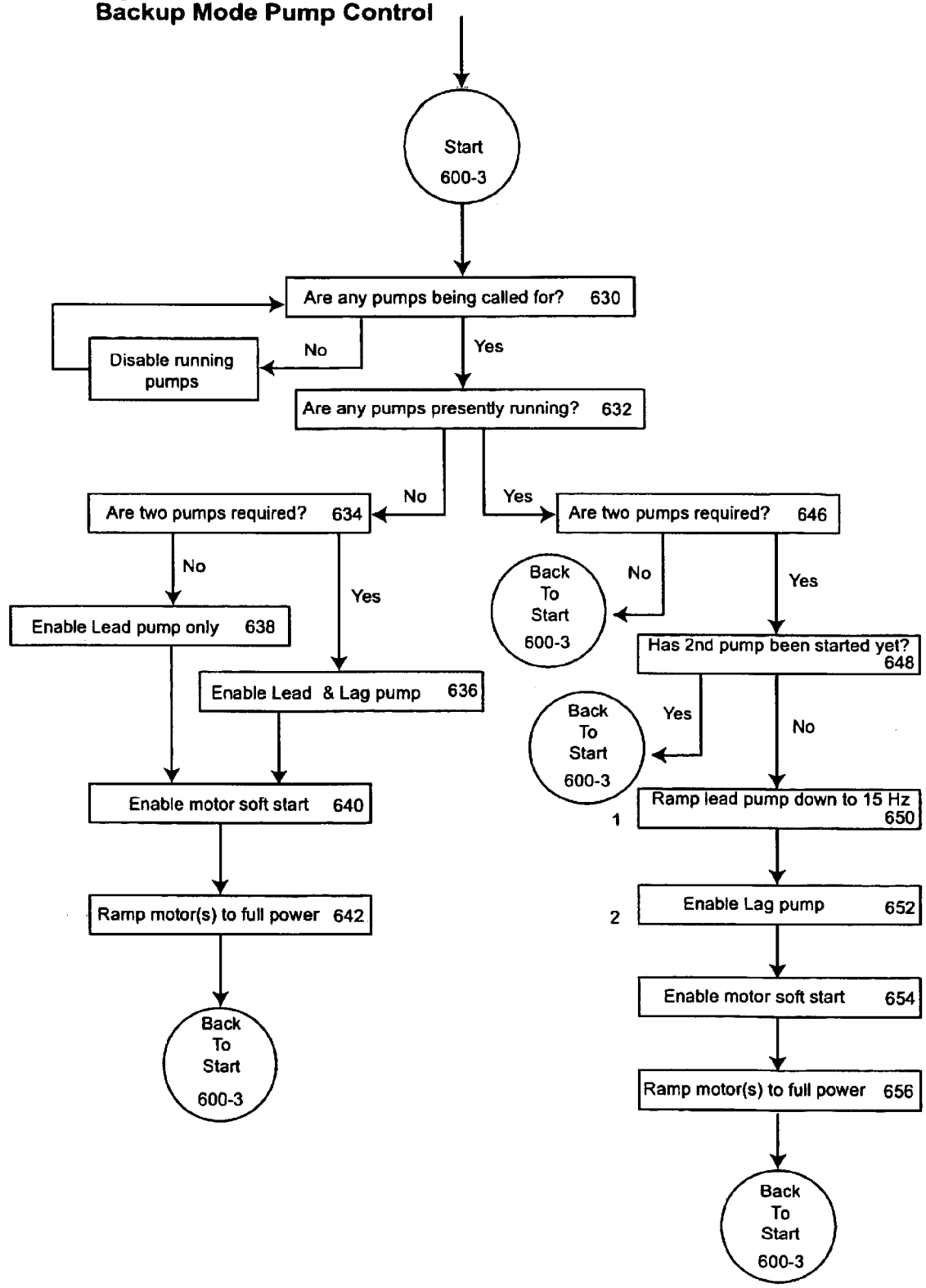

In step 602 a determination is made as to system operational mode, FIG. 10A. FIG. 10B illustrates load control steps when system 10 is in a utility power mode. FIG. 10C illustrates load control steps when system 10 is in a back-up power mode.

With respect to FIG. 10B, in step 610 a determination is made as to whether one or more loads, pumps, needs to be activated. If so, in step 612 a determination is made as to whether any pumps are currently running. If not, in step 614 a lag pump "on delay" timer is enabled. In a step 616 the lead pump is enabled.

Alternately, in step 620 a determination is made as to whether two pumps are required. In step 622 a determination is made as to whether the lag pump "on delay" timer has expired. If so, in step 624 the lag pump is enabled.

With respect to FIG. 10C in step 630 a determination is made as to whether any pumps have been called for. If so, in step 632 a determination is made as to whether any pumps are currently being activated.

If no pumps are being currently energized in step 634 a determination is made as to whether two pumps are required. If so, in step 636 both a lead and a lag pump are energized. If not, in step 628 only the lead pump is energized.

In step 640, whether one or two loads are to be powered, inverter 26 is activated to output multiphase AC at a relatively low frequency. In step 642 the AC output frequency from inverter 26 can be increased to 60 Hertz facilitating starting the load or loads with minimal starting current surges.

Where pumps are running, step 632, a determination is made as to whether the second pump has been started, step 648. In step 650 the drive frequency of the load pump, from inverter 26, is reduced to 15 Hertz. In step 652 the second load, the lag pump is enabled by closing the appropriate contactor. A low frequency soft start process is initiated in step 654. The drive frequency is increased to 60 Hertz coupling fill power to the loads step 656.

FIG. 11 is a flow diagram of a process 700 for evaluating available three phase utility power. In a step 702 sampling parameters are reset. In a step 704 analog-to digital converter 12-2 is enabled. In a step 706 the duration of the sample interval is checked. If the interval has expired, the peak converted value replaces the prior peak value.

In step 710 a determination is made as to whether the peak digitized value is above or below the required threshold value. If not, step 712a, the system power back-up mode is enabled. If so, step 712b, system 10 enters the normal, utility mode.

Other input power evaluating processes or criteria can be used without departing from the spirit and scope of the invention. For example, Fourier analysis can be conducted to evaluate input signal quality. The presence of transients can be evaluated. Other evaluation processes come within the spirit and scope of the invention.

FIG. 12 illustrates an exemplary system set-up screen. Using the PC or lap-top 20 the screen of FIG. 12 can be brought up and the indicated parameters specified or revised based on system configuration. It will be understood that other parameters can be incorporated into a screen as in FIG. 12 without departing from the spirit and scope of the invention.

FIGS. 13A, B, C illustrate a status display driven by processor 12-4, via output decoder 16-1. In FIG. 13A input utility power quality is adequate and valid on all phases. In FIG. 13B two phases of input utility power are low and invalid. In FIG. 13C two phases of input utility power are too high and are not valid. It will be understood that the contents of the display, as in FIG. 13A could be varied or expanded without departing from the spirit and scope of the invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A system comprising:
control circuitry including multi-phase input power sensing circuitry;
software executed by the control circuitry to evaluate the quality of sensed multi-phase input power, and, responsive to predetermined deficiencies therein, to output control signals to at least one battery driven output circuit module to provide non-utility multi-phase output power to drive at least one output device, and in the presence of satisfactory multi-phase input power to couple that input power to the at least one output device; and including additional software for receiving from a displace source, via a network, one of a first battery charging current profile, or, a second, different battery current charging profile.

2. A system as in claim 1 wherein available input power is supplied to charge a battery array coupled to the at least one output circuit module, to the extent possible, and wherein in response to a partial loss of input power the control circuitry supplies output control signals to the module to power the load with the expected form of electrical energy.

3. A system as in claim 1 which includes battery array monitoring circuitry coupled to the control circuitry.

4. A system as in claim 1 which includes an input port for receipt of remotely supplied parametric information.

5. A system as in claim 1 which includes software for receipt of system specifying parameters from an external source.

6. A system as in claim 1 which includes software for establishing expected load output current parameters.

7. A system as in claim 1 which includes software to display a system set-up screen enabling a user to specify system parameters.

8. A system comprising:
first and second loads;
a multi-phase AC input port;
control circuitry coupled to the input port for evaluating available multi-phase energy at the input port and for determining if the available energy is suitable for energizing at least one of the loads, including executable instructions for coupling available multi-phase input energy to the load if suitable, and for generating multi-phase AC-type output signals to energize the load in the absence of suitable available energy at the input port; and
a battery array and charging circuitry coupled to the array for charging the array in response to a prestored charging current profile which includes software for receipt of an externally supplied different charging current profile.

9. A system comprising:
first and second loads,
a multi-phase AC input port;
control circuitry coupled to the input port for evaluating available multi-phase energy at the input port and for determining if the available energy is suitable for energizing at least one of the loads, including executable instructions for coupling available multi-phase input energy to the load if suitable, and for generating multi-phase AC-type output signals to energize the load in the absence of suitable available energy at the input port and which includes software for evaluating current requirements of the loads and for varying an output signal frequency parameter to minimize load starting current requirements.

10. A system comprising:
first and second loads;
a multi-phase AC input port;
control circuitry coupled to the input port for evaluating available multi-phase energy at the input port and for determining if the available energy is suitable for energizing at least one of the loads, including executable instructions for coupling available multi-phase input energy to the load if suitable, and for generating multi-phase AC-type output signals to energize the load in the absence of suitable available energy at the input port which in response to unsuitable available external energy, executes instructions to charge a battery array to the extent possible with the available external energy, if any, and to energize at least one of the loads with AC-type multi-phase energy from the array.

11. A system comprising:
first and second loads;
a multi-phase AC input port;
control circuitry coupled to the input port for evaluating available multi-phase energy at the input port and for determining if the available energy is suitable for energizing at least one of the loads, including executable instructions for coupling available multi-phase input energy to the load if suitable, and for generating multi-phase AC-type output signals to energize the load in the absence of suitable available energy at the input port and which includes circuitry for varying an output signal frequency parameter to minimize starting current requirements of the at least one load.

12. A system as in claim 11 wherein the loads comprise first and second pump motors, and wherein the control circuits energize the motors in response to fluid level indicating signals.

13. A system as in claim 8 which includes a solar cell array coupled to the charging circuitry wherein the solar cell array, responsive to incident radiant energy, generates electrical energy for charging the battery array, at least in part.

14. A system as in claim 8 which includes instructions for receipt of load defining parameters from an external processor.

15. A system as in claim 8 comprising:
battery voltage step-up circuitry coupled between the battery array and a source of the AC-type output signals.

16. A system as in claim 15 wherein the source of the AC-type output signals comprises at least one inverter.

17. A system as in claim 16 wherein the source includes three AC-type output lines and the source generates three phase output power.

18. A system for driving first or second loads comprising:
an input power port;
an uninterruptible power supply;
first and second output ports;
switching circuitry coupled between the input port, the uninterruptible power supply and the output ports;
control circuitry coupled at least to the uninterruptible power supply and the switching circuitry and including circuitry to simultaneously couple input power to one output port and power from the uninterruptible supply to the other port in response to a predetermined condition.

19. A system as in claim 18 where the predetermined condition comprises a need to activate first and second motors, coupled to respective output ports, substantially simultaneously.

20. A system as in claim 18 which includes circuitry to vary an output frequency from the uninterruptible power supply in response to another predetermined condition.

21. A system as in claim 20 where the another predetermined condition comprises a motor starting condition.

22. A system as in claim 18 which includes a data input port coupled to the control circuitry for receipt of at least parameters from a displaced source via at least one of a modem or a computer network.

23. A system as in claim 22 where received parameters include a multi-valued battery charging profile.

24. A system as in claim 18 which includes battery storage and a solar cell array for at least in part, charging the battery storage.

* * * * *